United States Patent [19]

Field et al.

[11] 4,132,681
[45] Jan. 2, 1979

[54] FLUORINATED POLYETHER NETWORK POLYMERS

[75] Inventors: Donald E. Field, Falls Church, Va.; James R. Griffith, Riverdale Heights, Md.

[73] Assignee: United States of America as represented by the Secretary of the Navy, Washington, D.C.

[21] Appl. No.: 736,965

[22] Filed: Oct. 29, 1976

[51] Int. Cl.² ............................................. C08G 59/04
[52] U.S. Cl. ............................... 260/836; 260/348.48; 260/348.49
[58] Field of Search ................. 260/2 EP, 2 EC, 2 N, 260/2 BP, 78.41, 348.48, 348.49, 836

[56] References Cited

U.S. PATENT DOCUMENTS

| | | | |
|---|---|---|---|
| 3,852,222 | 12/1974 | Field et al. | 260/2 EP |
| 3,872,045 | 3/1975 | Field et al. | 260/31.2 R |
| 3,879,430 | 4/1975 | O'Rear et al. | 260/348 R |

*Primary Examiner*—Harold D. Anderson
*Assistant Examiner*—E. A. Nielsen
*Attorney, Agent, or Firm*—R. S. Sciascia; Philip Schneider; Thomas McDonnell

[57] ABSTRACT

A random fluorinated polymer of the general formula:

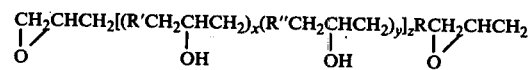

wherein x is an integer from 1 to 4, y is an integer from 1 to 4, z is 1 or more, R' is selected from the group consisting of the 1,3 and the 1,4 isomers of —OC(CF₃)₂φC(CF₃)₂O—, R″ is selected from the group consisting of the cis and trans isomers of —O(CF₃)₂CCH₂CH═CHC(CF₃)₂O—, and R is either R' or R″; and epoxy resins and urethane resins prepared therefrom.

5 Claims, No Drawings

FLUORINATED POLYETHER NETWORK POLYMERS

BACKGROUND OF THE INVENTION

The invention relates generally to epoxy and urethane resins and more particularly fluorinated epoxy and urethane resins.

Fluorinated polymers of the general formula:

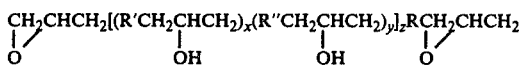

where R' is either the 1,3 or the 1,4 isomer of bis(2-hydroxyhexafluoro-2-propyl)benzene, R" is $-OCH_2(CF_2)_zCH_2O-$, and R is either R' or R" have chemical characteristics of epoxies when z is from 1 to 10 and have the characteristics of polyols when z exceeds 10. Consequently the "polyol" polymer can be crosslinked with polyisocyanates to form highly fluorinated urethane films and coatings having exceptional heat, light, and chemical resistance. The "epoxy" polymers can be cross linked to form highly fluorinated epoxy resins which also are exceptionally heat, light, and chemical resistant and which can be used as adhesives, structural materials, and coatings. These polymers, epoxy resins, and urethane resins are disclosed in U.S. Pat. No. 3,852,222 by Field et al and in U.S. Pat. No. 3,872,045 by Field et al.

The preparation of these fluorinated polymers require hexafluoropentanediol as a precursor. This compound is both scarce and expensive. Consequently, the extent of use of these valuable fluorinated polymers is restricted by the cost and difficulty of their preparation.

SUMMARY OF THE INVENTION

It is therefore an object of this invention to provide fluorinated polyol and epoxy polymers which do not require an expensive and scarce precursor.

Another object of this invention is to provide fluorinated epoxy and urethane resins having exceptional heat, light, and chemical resistance and a low surface energy.

And another object of this invention is to provide fluorinated epoxy and urethane resins which are easily applied as coatings.

A further object of this invention is to provide highly fluorinated epoxy and urethane resins at a reduced cost.

These and other objects are achieved by the random fluorinated polymers of the following formula which have the exceptional chemical and physical properties of the polymers disclosed in U.S. Pat. Nos. 3,852,222 and 3,872,045 but do not require hexafluoropentadiol as a precursor:

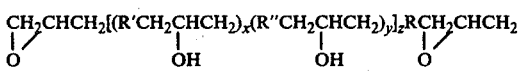

wherein x is an integer from 1 to 4, y is an integer from 1 to 4, z is 1 or more, R' is selected from the group consisting of the 1,3 and 1,4 isomers of $-OC(CF_3)_2\phi C(CF_3)_2O-$, R" is selected from the group consisting of the cis and trans isomers of $-O(CF_3)_2CCH_2CH=CHC(CF_3)_2O-$ and R is either R' or R"; and epoxy resins and urethane resins prepared therefrom.

DETAILED DESCRIPTION OF THE INVENTION

The precursor replacing hexafluoropentanediol is the cis and/or trans isomer of the fluorinated diol:
$HO(CF_3)_2CCH_2CH=CHC(CF_3)_2OH$.

This diol was synthesized according to the method disclosed in Field et al. *Fluorinated Polyepoxy and Polyurethane Coatings* in J. Coatings Tech. 48(615) p. 43–47, April 1976.

The random fluorinated polymers of this invention are synthesized according to the following equation:

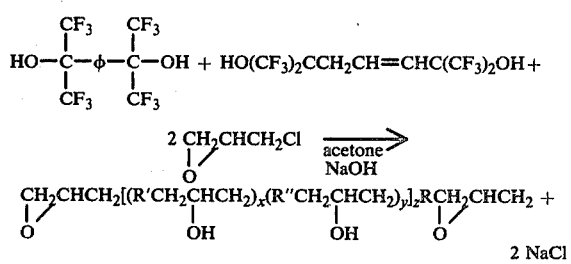

wherein x is an integer from 1 to 4, y is an integer from 0 to 4, z is 1 or more, R' is selected from the group consisting of the 1,3 and the 1,4 isomers of $-OC(CF_3)_2\phi C(CF_3)_2O-$, R" is selected from the group consisting of the cis and trans isomers of $-O(CF_3)_2CCH_2CH=CH_1C(CF_3)_2O-$ and R is either R' or R".

The random fluorinated polymers of the present invention were synthesized by refluxing 1,3 and 1,4-bis-(2-hydroxyhexafluoro-2-propyl)benzene and the diol of the formula:

$HO(CF_3)_2CCH_2CH=CHC(CF_3)_2OH$ with epichlorohydrin and sodium hydroxide in an amount from the equivalent weight to a 10 eq. wt. percent excess in a solution of acetone containing no more water than the weight of NaOH until the reaction was determined complete by a gas chromatograph monitoring of the reaction. Upon completion of the reaction most of the acetone was stripped from the viscous polymer and was then poured into a large excess of distilled water (800 ml of water for each 100 gm of polymer product). The mixture was heated to 80° C., stirred, cooled to 23° C., and decanted of wash water. Washing was continued until the water was free of base. The polymer was dried at 120° C., dissolved in a solvent comprising a 20:20:60 volume percent blend of ethyl acetate, methyl isobutyl ketone, and ethylene glycol monoethyl ether acetate at 50 percent by weight, and filtered.

The product is a random polymer with an average chain length which depends on the amount of epichlorohydrin used in the synthesis. If the amount of epichlorohydrin is from the equivalent amount, i.e., 1 mole for each mole of polyol up to a 15 percent excess, the average repetition of the repeating unit is greater than 10. Analysis has shown the average repetition to be as high as 20. The polymer with these chain lengths has the chemical characteristic of a polyol and are referred to as the "polyol" polymers of this invention. If the excess of epichlorohydrin is greater than 15 mole percent, the average repetition of the repeating unit is from 1 to 10.

Like the polymers of U.S. Pat. Nos. 3,852,222 and 3,872,045, the polymers behave chemically as epoxies. Accordingly these polymers are referred to as the "epoxy" polymers of this invention. Since the change from an epoxy character to a polyol character is gradual and a sample of the polymer has numerous chain lengths, there is range of chain lengths in which the two characters are nearly the same. An average repetition of the repeating unit from about 9 to about 11 gives a polymer with almost equal polyol and epoxy characters.

The polymers of this invention form urethane and epoxy coatings as readily and in the same manner as the polymers of U.S. Pat. Nos. 3,852,222 and 3,872,045.

Urethane resin coatings are conveniently obtained from a three component system: a polyisocyanate, catalyst, and a solution comprising the "polyol" polymer, pigments and/or extenders, and a solvent. The three components are mixed together to form a polyisocyanate solution which then reacts to form an urethane coating.

Any polyisocyanate is suitable for the practice of this invention. The most important are hexamethylene disocyanate (HDI), toluene diisocyanate (TDI), and derivatives thereof (such as the higher condensation products of TDI or HDI). The polyol and the polyisocyanate are mixed in approximately equivalent weights (a NCO—OH ratio from 1.0:1.1 to 1.1:1.0). Other amounts could be used but no advantage would be obtained and material would be wasted.

The characteristics of a suitable solvent are a moderate evaporation, non-reactive with the reactants, e.g., an alcohol, and no hindrance with the resulting film integrity. Typical of the solvents which can be utilized are esters, such as butyl acetate and amyl acetate; ketones, such as, methyl ethyl ketone, and methyl isobutyl ketone; and aromatic hydrocarbons, such as xylene and toluene. The preferred solvent is 20:20:60 volume percent blend of ethyl acetate (20), methyl isobutyl ketone (20), and ethylene glycol monoethyl ether acetate (60). The amount of solvent would depend on the desired viscosity of the isocyanate solution. The urethane reaction may be catalyzed by any of the urethane catalysts. The polymers of this invention do not present any new or special problems in forming urethane coatings. The entire urethane technology would be applicable to reactions between these "polyol" polymers and polyisocyanates. Exemplary of suitable catalysts are tertiary amines, such as dimethyl benzylamine and organometallics, such as dibutyl tin dilaurate.

Epoxy resin coatings are readily formed from a two component system: a solution comprising the "epoxy" polymers, a solvent, and pigments and/or extenders and a curing agent which promotes the reaction and crosslink with the epoxy groups. The two components are mixed together to form the epoxy solution which reacts to form an epoxy coating.

The curing agent component includes one or more curing agents such as primary and secondary amines, which may be either aliphatic or aromatic, or organic acid anhydrides. If an acid anhydride is selected, a catalyst in an amount from 0.15 to 0.60 weight percent of the solution, is included, such as, dimethyl benzylamine in order to reduce the curing temperature and time. Again it should be noted that the polymers of this invention do not present any new or special problems. Hence the entire epoxy resin technology is applicable to these polymers. Examples of suitable curing agents are phthalic anhydrides and derivatives thereof, such as, hexahydrophthalic anhydride, diels-alder adducts, metaphenylene diamine, diethylene triamine, and xylylene diamine. The amine is added in an amount which would provide one equivalent weight of epoxy for each aminohydrogen. A ten percent variation in either direction is possible. The acid anhydride is added in an amount from 80 to 90 weight percent of the equivalent weight of the acid anhydride.

The solvent may be any of the epoxy solvents. Examples of such solvents are the same as the ones listed previously for urethane coatings. Since no isocyanate groups are present, it is possible to include alcohols as solvents. The amount of solvent depends on the desired viscosity of the solution. Generally, solutions having from 30 to 65 weight percent solvent are the most useful in coating surfaces.

An epoxy coating is obtained by heating the epoxy solutions at a temperature from 20° C. to 40° C. for three to four hours, followed by a post cure of about one hour at a temperature from 55 to 70° C. If the epoxy has a anhydride and a secondary catalyst, such as a tertiary amine, the cure is at a temperature from 75° to 85° C. for about one hour and the post cure at a temperature from 110° C. to 130° C. for about 3 hours. These temperatures and times given above on those which give an excellent coating in a reasonable amount of time. Many other times and temperatures could be used.

Both solutions may include additional ingredients such as pigments, pigment extenders, and fillers. The pigment extenders or fillers act to reduce the cost of the coating improve consistency, leveling, and pigment settling in the coating. Certain extenders reinforce the structure of the dry coating mechanically, while other increase its resistance to the transmission of moisture. The pigments and extenders are added to hide and/or protect the surface beneath the paint. They often perform other important functions such as reflecting destructive light rays.

Pigments useful in the present invention are titanium dioxide, phthalocyanine blue, carbon black and aluminum flake. Other pigments which may be used are the white hiding pigments, such as basic carbonate white lead, basic silicate white lead, basic sulfate white lead, zinc oxide, leaded zinc oxide, antimony oxide and lithopone. Extender pigments can be used as well. Among these are the hydrated aluminum silicates, magnesium silicate (talc), silica, calcium carbonate, barium sulfate, calcium sulfate and powdered mica. Should color be desired the color pigments may be used. These are classified as natural pigments, synthetic inorganic pigments and synthetic organic pigments.

The natural pigments comprise the inorganic earth colors or mined products and a few organic materials of vegetable and animal origin. Of chief importance are the iron compounds, composed mainly of iron oxides in combination with siliceous material and smaller percentages of the oxides of manganese, aluminum, calcium, and/or magnesium, together with some carbonaceous matter. These ferro-ferric oxide pigments include the yellow ochers, the dark yellow siennas, the brown umbers, the rod hematites and burnt siennas, and the black magnetite or magnetic oxide.

The synthetic inorganic pigments contemplated are the iron oxides, iron blues such as ferric-ferrocyanides, chromate pigments, chrome greens, chromium oxides and their hydrates, ultramarine blue, and cadmium yellow and reds.

The synthetic organic pigments are the copper phthalocyanine blues and greens, toluidine reds, para reds, lithol reds, yellows, benzidine yellows, tungstated and molybdated pigments.

An important group of pigments are those used entirely for their ability to inhibit metallic corrosion. These include red lead ($Pb_3O_4$), sublimed blue lead (basic lead sulfate, blue), calcium plumbate, basic lead chromate, zinc chromate (zinc yellow), zinc tetroxychromate, and strontium chromate. Unique among the rust-inhibiting pigments is a recently marketed basic lead silico-chromate pigment consisting of a shell of basic lead chromate fused to an inert core of silica.

Metallic pigments for use in paints are usually in flake form. A useful metallic pigment is aluminum. Metallic copper and its alloys with aluminum tin or zinc yield a bronze finish. Zinc dust is useful as gold and silver flake and stainless steel flake. The invention further contemplates the use of black pigments and fluorescent pigments.

The polymers of this invention are sufficiently fluorinated to be compatable with highly fluorinated fillers such as poly-(tetrafluoroethylene) (TFE) and poly-(fluoroethylene-propylene) (FEP). No significant difference has been found between the polymers of this invention and those of the previously cited U.S. patents in regard to compatibility with highly fluorinated fillers. Dry coatings with 55 weight percent of tetrafluoroethylenes have been consistently obtained with the polymers of this invention. Best coating integrities have been obtained with fillers having a particle size up to 100 microns.

Exemplary of the coating compositions prepared in accordance to this invention are herein given as illustration of the practice of this invention.

EXAMPLE I 86.1 gm "polyol" polymer
12 gm TFE powder
24 gm $TiO_2$

These ingredients were ground in a ball mill for 48 hours. Then the following was added to a 47.6 gm sample of the above:

18.8 gm Desmodur N 7.2 gm 0.176% solution of DBTDL in a 20:20:60 vol % blend of ethyl acetate, methyl isobutyl ketone, and ethylene glycol monoethyl ether acetate.

The composition was applied to a panel. At a 60° angle of incidence, the reflectance was 88%.

Results of other coating compositions within the scope of this invention are reported in Donald C. Field. *Fluorinated Polyepoxy and Polyurethane Coating*, In J. Coatings Tech. 48(615):p. 43–47, April 1976. The article is herein incorporated by reference.

As the results demonstrate, the polymers and coatings of this invention have exceptional properties with many potential uses. Four aspects of these polymers and coatings which are especially important are their high fluorine content, their solubility in solvents, their ability to form excellent coatings having a high content of a highly fluorinated polymer, and their reduced cost.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A polymer of the general formula:

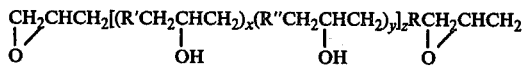

wherein x is an integer from 1 to 4, y is an integer from 1 to 4, z is 1 or more, R' is selected from the group consisting of the 1,3 and the 1,4 isomers of $-OC(CF_3)_2\phi C(CF_3)_2O-$, R" is selected from the group consisting of the cis and trans isomers of $-O(CF_3)_2CCH_2CH=CH_1C(CF_3)_2O-$ and R is either R' or R".

2. The polymer of claim 1 wherein z is from 1 to 10.
3. The polymer of claim 1 wherein z is from greater than 10.
4. A thermoset resin obtained by curing a composition comprising the polymer of claim 2.
5. A thermoset resin coating obtained by curing a mixture comprising the epoxy resin of claim 4 and a fluorinated polymer selected from the class consisting of poly-(tetrafluoroethylene) and poly-(fluoroethylene-propylene) in an amount up to 55 percent of said coating.

* * * * *